(12) United States Patent
Kumar

(10) Patent No.: US 9,190,899 B2
(45) Date of Patent: Nov. 17, 2015

(54) POWER FACTOR CORRECTION (PFC) CIRCUIT CONFIGURED TO CONTROL HIGH PULSE LOAD CURRENT AND INRUSH CURRENT

(71) Applicant: GENERAL ELECTRIC COMPANY, Schenectady, NY (US)

(72) Inventor: Niranjan Kumar, Bangalore (IN)

(73) Assignee: General Electric Company, Schenectady, NY (US)

( * ) Notice: Subject to any disclaimer, the term of this patent is extended or adjusted under 35 U.S.C. 154(b) by 349 days.

(21) Appl. No.: 13/627,490

(22) Filed: Sep. 26, 2012

(65) Prior Publication Data

US 2013/0077362 A1  Mar. 28, 2013

(30) Foreign Application Priority Data

Sep. 28, 2011 (IN) .......................... 3366/CHE/2011

(51) Int. Cl.
*H02M 1/42* (2007.01)
*H02M 7/12* (2006.01)

(52) U.S. Cl.
CPC ............ *H02M 1/4225* (2013.01); *H02M 7/125* (2013.01); *Y02B 70/126* (2013.01)

(58) Field of Classification Search
USPC ................. 323/266, 267, 268, 271, 282–290; 363/49, 16, 20, 21.01, 21.02, 21.03, 363/21.1, 95, 97, 131
See application file for complete search history.

(56) References Cited

U.S. PATENT DOCUMENTS

| | | |
|---|---|---|
| 5,010,293 A | 4/1991 | Ellersick |
| 5,087,871 A | 2/1992 | Losel |
| 5,122,724 A | 6/1992 | Criss |
| 5,283,707 A | 2/1994 | Conners et al. |
| 5,438,505 A * | 8/1995 | Cohen ............................ 363/95 |
| 5,568,041 A * | 10/1996 | Hesterman ................... 323/207 |
| 6,198,642 B1 * | 3/2001 | Kociecki ......................... 363/37 |
| 6,487,098 B2 | 11/2002 | Malik et al. |
| 6,594,158 B2 * | 7/2003 | Batarseh et al. ................ 363/16 |
| 6,879,053 B1 * | 4/2005 | Welches et al. ................... 290/6 |
| 6,950,322 B2 * | 9/2005 | Ferens ............................ 363/44 |
| 7,139,180 B1 | 11/2006 | Herbert |
| 7,154,250 B2 | 12/2006 | Vinciarelli |
| 7,157,886 B2 | 1/2007 | Agarwal et al. |
| 7,385,375 B2 * | 6/2008 | Rozman ........................ 323/224 |
| 7,439,682 B2 | 10/2008 | Caiafa et al. |
| 7,564,706 B1 | 7/2009 | Herbert |
| 7,719,248 B1 * | 5/2010 | Melanson ..................... 323/283 |

(Continued)

OTHER PUBLICATIONS

Andersen: Current Programmed Control of a Single-Phase Two-Switch Buck-Boost Power Factor Correction Circuit, IEEE transactions on industrial electronics, vol. 53, No. 1, pp. 263-271, Feb. 2006.

*Primary Examiner* — Adolf Berhane
*Assistant Examiner* — Nusrat Quddus
(74) *Attorney, Agent, or Firm* — GE Global Patent Operation; Marc A. Vivenzio

(57) ABSTRACT

A power circuit for protecting against high pulse load current and inrush current is disclosed. The power circuit comprises a buck-boost module and a PFC controller operatively coupled with the buck-boost module. The PFC controller is configured to receive an input voltage feedback, an output voltage feedback, and a current feedback, and is configured to utilize one of an Integral Gain Compensation (IGC) and an Integral Value Compensation (IVC) to control the high pulse load current and inrush current in the power circuit.

11 Claims, 14 Drawing Sheets

(56) References Cited

U.S. PATENT DOCUMENTS

| | | | |
|---|---|---|---|
| 7,859,872 B1 * | 12/2010 | Johns | 363/89 |
| 7,923,973 B2 * | 4/2011 | Odell | 323/207 |
| 8,040,114 B2 * | 10/2011 | Saint-Pierre | 323/222 |
| 8,102,679 B2 * | 1/2012 | Gong et al. | 363/21.12 |
| 8,184,455 B2 * | 5/2012 | Chen et al. | 363/16 |
| 8,193,798 B1 * | 6/2012 | Pace et al. | 323/284 |
| 8,536,803 B2 * | 9/2013 | Sadwick et al. | 315/307 |
| 8,593,127 B2 * | 11/2013 | Odell | 323/285 |
| 8,729,772 B1 * | 5/2014 | Persson et al. | 310/317 |
| 2006/0023476 A1 * | 2/2006 | Fosler | 363/49 |
| 2008/0205104 A1 * | 8/2008 | Lev et al. | 363/98 |
| 2008/0285313 A1 * | 11/2008 | Oettinger et al. | 363/26 |
| 2009/0034686 A1 | 2/2009 | Soto Santos | |
| 2009/0279331 A1 | 11/2009 | Young et al. | |
| 2010/0033150 A1 * | 2/2010 | Irissou et al. | 323/284 |
| 2010/0226149 A1 * | 9/2010 | Masumoto | 363/20 |
| 2011/0134670 A1 * | 6/2011 | Colbeck et al. | 363/124 |
| 2012/0169240 A1 * | 7/2012 | Macfarlane | 315/152 |
| 2014/0225430 A1 * | 8/2014 | Oyobe et al. | 307/9.1 |

\* cited by examiner

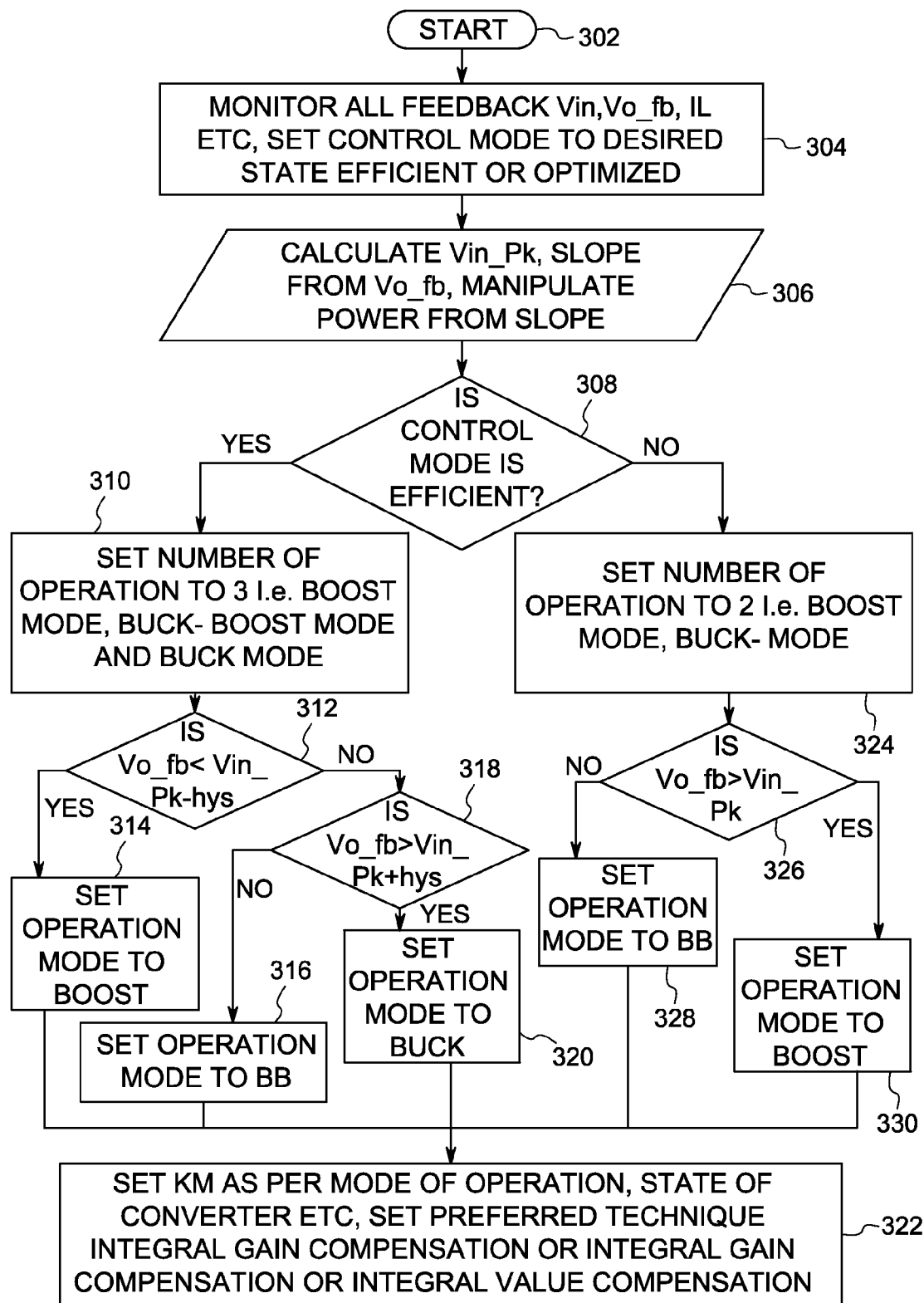
FIG. 3A    METHOD 300

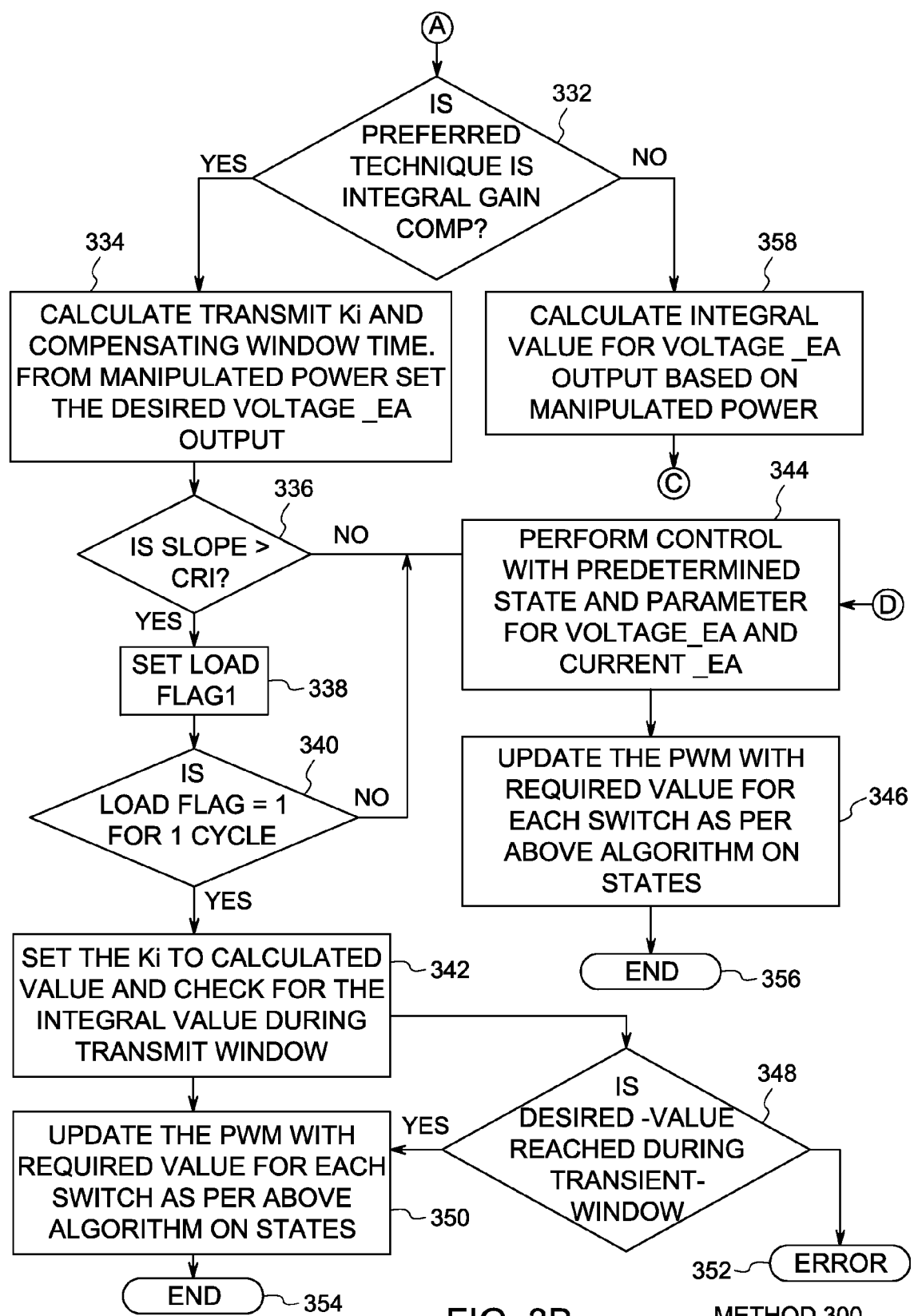
FIG. 3B    METHOD 300

POWER FACTOR CORRECTION (PFC) CIRCUIT CONFIGURED TO CONTROL HIGH PULSE LOAD CURRENT AND INRUSH CURRENT

BACKGROUND OF THE INVENTION

Embodiments of the present invention relate generally to current control techniques and overload protection circuits and, more particularly to a power factor correction (PFC) circuit configured to control high pulse load current and inrush current.

PFC circuits utilize various protection means against high pulse load current and inrush current. The inrush current is an initial high current flow, usually a short duration surge, usually attributable to a highly reactive initial power load. Such inrush current is undesirable, and may cause damage to circuitries across application instruments, such as, a mobile or portable radiographic X-ray machine.

Various circuits and techniques have been used in the past to control high pulse load current and inrush current. For example, one such conventional technique utilizes a power factor controller using a boost converter. However, this technique has a high storage device requirement, since the output voltage control has to be slow to maintain PFC and there is restriction on output voltage for stable operation of the boost converter.

Furthermore, several PFC circuit providers and generally known digital control techniques address the inrush and pulse load current issues by doing the compensation on a voltage control loop. The compensation is generally done by monitoring the status of output voltage of a boost converter and then changing the proportional gain of current controller (feedback compensation). Since the output voltage is not well controlled for a boost converter in a PFC topology and it carries lot of low frequency ripple (double the line frequency), the compensation is done at a relatively slower rate. For an application like a mobile X-ray machine, where the peak power is very high (much higher than the maximum available power from a wall socket), the time taken by conventional compensation results in very high values of the storage capacitor. Further, as the load range is very high in high power mobile radiographic X-ray application, the loss in the DC-DC converter is very high at a lower load because of a high DC bus voltage value. At a lower load, the DC bus voltage value should be lower so that the loss in the DC-DC converter can be lowered. This helps the DC-DC converter work for a longer period of time. Many designs include a buck switch with a freewheeling diode to enable the DC-DC converter to lower the DC bus voltage value more than the input peak voltage.

Therefore, there exists a need for a power factor correction (PFC) circuit with a novel system and method for controlling high pulse load current and inrush current.

BRIEF DESCRIPTION OF THE INVENTION

In accordance with one embodiment of the invention, a power circuit for protecting against high pulse load current and inrush current is disclosed. The power circuit comprises a buck-boost module and a PFC controller operatively coupled with the buck-boost module. The PFC controller is configured to receive an input voltage feedback, an output voltage feedback, and a current feedback, and is further configured to utilize one of an Integral Gain Compensation (IGC) and an Integral Value Compensation (IVC) to control the high pulse load current and inrush current in the power circuit.

In accordance with another embodiment of the invention, a method for controlling high pulse load current and inrush current in a power circuit is disclosed. The method comprises receiving an input voltage feedback, receiving an output voltage feedback, and receiving a current feedback. Further, the method comprises utilizing one of an Integral Gain Compensation (IGC) and Integral Value Compensation (IVC) for managing operations of the power circuit in order to control the high pulse load current and the inrush current in the power circuit instantaneously.

In accordance with yet another embodiment of the invention, a method utilizing one of an Integral Gain Compensation (IGC) and Integral Value Compensation (IVC) techniques for controlling charging/loading current at a value for ensuring no output disturbances is disclosed. The method comprises determining a load value and a load flag value, providing a slope of an output voltage feedback and manipulating values of load and time. Additionally, the method comprises compensating required input alternating current instantaneously for a given pulse load by utilizing one of the Integral Value compensation and the Integral gain compensation, providing a boost flag, where the boost flag indicates a mode of operation, and calculating the current limiting constant, and producing a rectified scaled down sinusoidal waveform. Further, the method comprises multiplying an output from the voltage error amplifier with the current limiting constant, providing output to control a duty cycle, and controlling inductor current values by changing the current limiting constant for controlling charging/loading current at a value for ensuring no output disturbances.

In accordance with yet another embodiment of the invention, a dynamic compensation method for controlling high pulse load current and inrush current in a power circuit is disclosed. The method comprises calculating one or more parameters, operating the power circuit in one of a normal mode and an efficient mode and changing its mode of operation without losing input current stability, during the normal mode, operating the power circuit in a boost mode when output voltage is higher than instantaneous input AC voltage, and operating in buck-boost mode, when output DC voltage is lower than the instantaneous input AC voltage, during the efficient mode, operating the power circuit in boost mode when output voltage is higher than instantaneous input AC voltage, working in buck-boost mode when output voltage is approximately equal to or in the near vicinity of instantaneous input AC voltage and working in buck mode when instantaneous input AC voltage is significantly higher than output voltage, setting a current limiting constant as per operation mode and state of the power circuit and setting a technique as one of an integral gain compensation (IGC) and an integral value compensation (IVC), calculating a transient integral gain and compensating window time and setting an output of a voltage error amplifier, when the preferred technique is the integral gain compensation (IGC), setting the integral gain to the calculated value and checking for the integral value during a transient window, calculating integral value for the voltage error amplifier based on manipulated power, when the technique is the integral value compensation (IVC), resetting the integral portion of the voltage error amplifier to the calculated integral value, and updating one or more pulse width modulators with a value for each switch as per above steps.

BRIEF DESCRIPTION OF THE DRAWINGS

These and other features, aspects, and advantages of embodiments of the present invention will become better understood when the following detailed description is read with reference to the accompanying drawings in which like characters represent like parts throughout the drawings, wherein:

FIGS. 3A and 3B are flow diagrams of a method for deciding a mode of operation and current compensation techniques in accordance with an embodiment of the invention;

DETAILED DESCRIPTION OF THE INVENTION

Various embodiments of the present invention provide an efficient, compact, cost effective and stable power factor correction (PFC) converter circuit. PFC converter circuits are utilized in several applications including mobile and portable radiographic X-ray machines that can be operated from a standard wall socket (e.g. conditions in which the maximum current available is limited). Specifically, embodiments provide a novel scheme to control inrush current at a specified level of ramp slope and peak current during start-up, to control the line current instantaneously for pulse load, and to control the output DC bus voltage. A single pulse width modulation (PWM) and control loop with different compensation techniques i.e. 'Integral Gain Compensation (IGC) and Integral Value Compensation (IVC)' are used in embodiments of the present invention to do the above functions. Embodiments of the present invention utilize 'buck switches' and 'freewheeling diodes' in addition to a normal interleaved boost converter. The same PWM signal is used for all switches (fixed phase shift of 180 degrees for an interleaved switch) during a 'buck-boost mode' of operation. The buck switches are continuously in an "ON" state during a 'boost mode' of operation and boost switches are continuously in an "OFF" state during a 'buck mode' of operation. The PFC converter changes modes of operation between boost to buck-boost or boost to buck-boost to buck modes depending on the power requirement, output voltage and input voltage as per a control algorithm as explained in FIGS. 3A and 3B, and FIG. 4 below. The PFC converter circuit controls the specified current in all modes of operation. Since the disclosed control algorithm compensates line current with respect to load instantaneously due to unique technique of IGC or IVC, it significantly reduces the size of a storage device requirement for a given load and given time. Therefore, the overall size of the PFC converter is reduced resulting in a very compact design.

Figure 1:
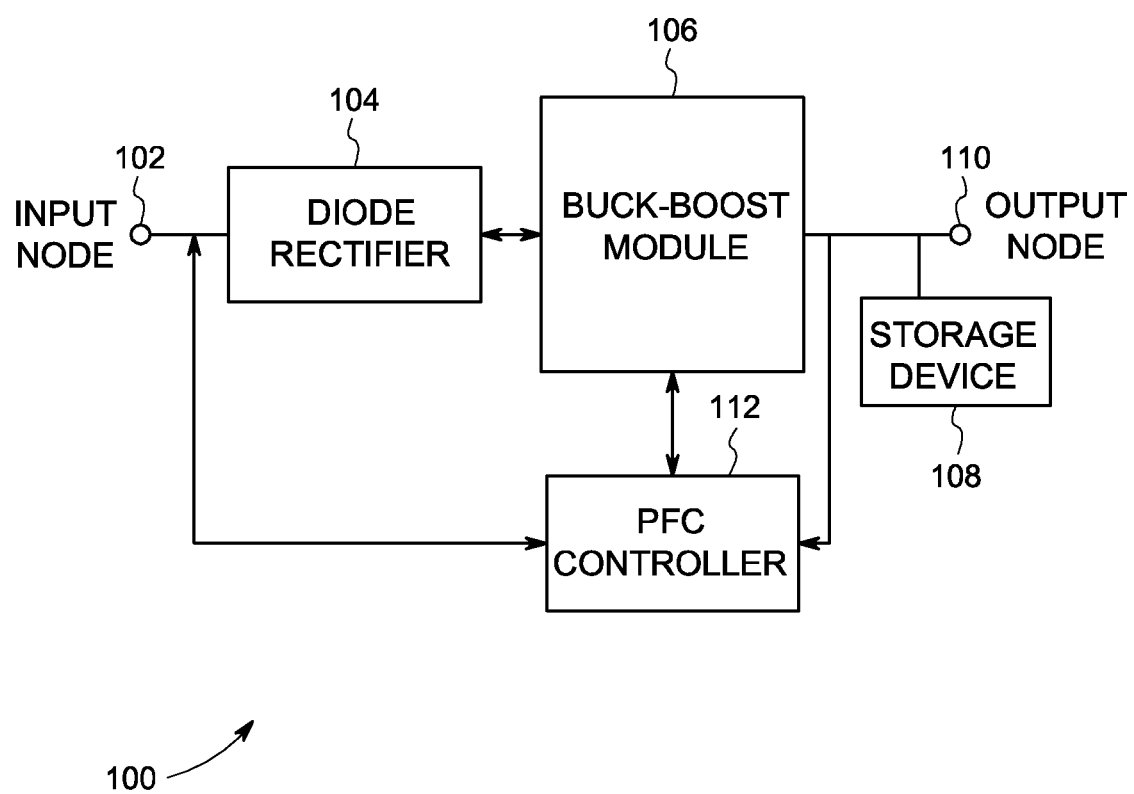
FIG. 1 is a block diagram of a power factor correction (PFC) converter circuit in accordance to an embodiment of the invention.

FIG. 1 is a high level block diagram of a PFC converter circuit according to an embodiment of the invention. The PFC converter circuit 100 is an interleaved buck-boost PFC converter circuit that utilizes a novel method for controlling high pulse load current and inrush current.

The PFC converter circuit 100 includes an input node 102, a diode rectifier 104, a buck-boost module 106, a storage device 108, an output node 110, and a power factor correction (PFC) controller 112. The input node 102 may be a universal AC input connected to the diode rectifier 104 and connected to an input voltage measuring circuit (not shown). The diode rectifier 104 is operatively coupled with the buck-boost module 106, wherein the buck-boost module 106 is connected to the storage device 108 and a load (not shown) through the output node 110.

The PFC controller 112 is operatively coupled to circuitry (i.e., the diode rectifier 104, the buck-boost module 106, the storage device 108, and the output node 110) and receives feedback, such as an input voltage feedback (Vin), an output voltage feedback (Vo_fb), and a current feedback (IL). On the basis of this feedback and the control algorithm, the PFC controller 112 operates the buck-boost module 106 and controls high pulse load current and inrush current in the PFC converter circuit.

Figure 2:
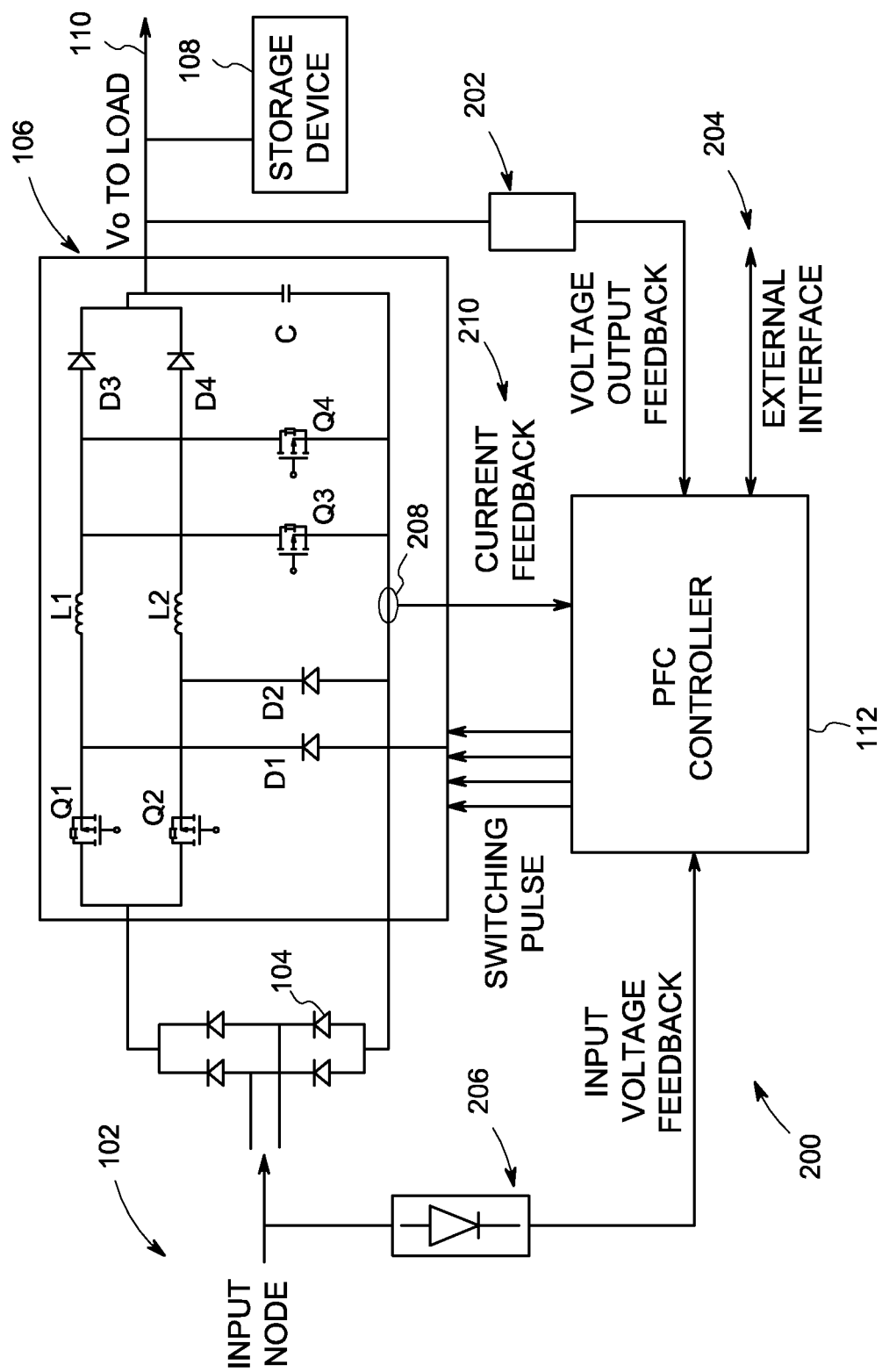
FIG. 2 is a power and control schematic of a buck boost interleaved PFC in accordance to an embodiment of the invention.

FIG. 2 is a detailed power and control schematic of the buck-boost interleaved PFC converter circuit 200.

The schematic represents a PFC converter circuit 200 that includes the input node 102 (i.e., the universal AC input) connected to the diode rectifier 104 and an input voltage measuring circuit 206. The diode rectifier 104 is connected to the buck-boost module 106, wherein the buck-boost module 106 is connected to the storage device 108 and a load (not shown) at the output node 110.

The buck-boost module 106 includes two buck switches Q1 and Q2 operatively connected to two freewheeling diodes D1 and D2 and boost inductors L1 and L2 respectively. The boost inductors L1 and L2 are connected to two boost switches Q3 and Q4 and with two boost diodes D3 and D4 respectively. The boost diodes D3 and D4 are connected to a capacitor C, the storage device 108, the load and an output voltage measurement circuit 202. Further an inductor current measurement circuit 208 is connected between the boost switches Q3 and Q4 and the freewheeling diodes D1 and D2. The buck switches Q1, Q2, Q3 and Q4 are also coupled in such a way as to drive the PFC converter circuit 200 from the PFC controller 112.

The PFC converter circuit 200 receives various feedbacks, such as the input voltage feedback from the input voltage measuring circuit 206, the output voltage feedback from the output voltage measurement circuit 202, and a current feedback from the inductor current measurement circuit 208. On the basis of received feedbacks and utilizing a feedback and feed forward based compensation algorithm i.e. IGC or IVC (as explained in FIG. 3A and FIG. 3B below), the PFC converter circuit 200 enables the current to reach the desired current instantaneously, resulting in minimum possible requirement of storage energy for a given 'Pulse Load for Specified Time'. In order to achieve this, the PFC converter circuit 200 operates either in optimized mode or efficient mode. In normal mode it operates in boost mode when the output voltage is higher than the instantaneous input AC voltage and operates in buck-boost (both boost and buck switch turned ON and OFF together) mode when the output DC voltage is lower than the instantaneous input AC voltage. During the efficient mode, the PFC converter circuit 200 operates in boost mode when the output voltage is higher than the instantaneous input AC voltage, operates in buck-boost mode when output voltage is approximately equal to instantaneous input AC voltage, and operates in buck mode when the instantaneous input AC voltage is significantly higher that the output voltage.

Figure 3B:
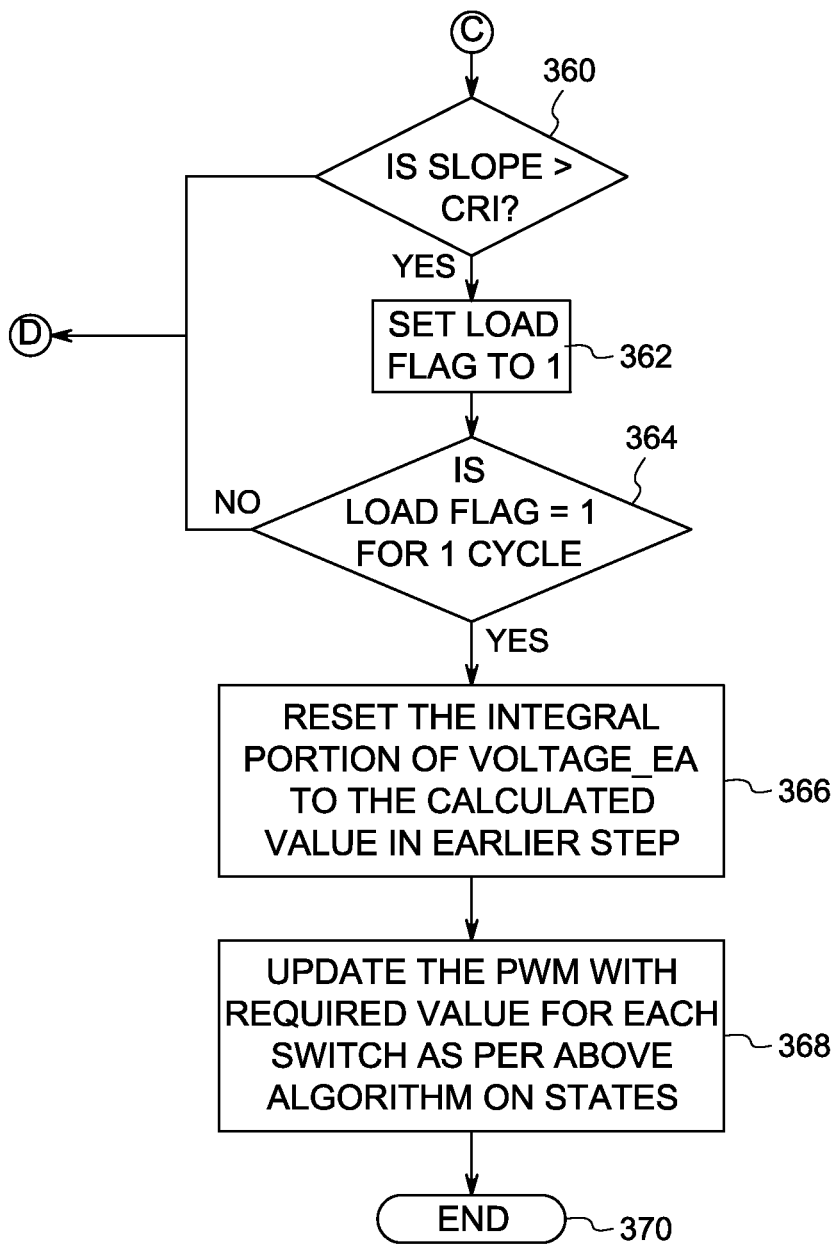

FIGS. 3A and 3B illustrate a flow diagram of a method 300 for deciding a mode of operation and current compensation techniques.

The method 300 starts at step 302 and proceeds to step 304, at which feedback, such as input voltage feedback (Vin), output voltage feedback (Vo_fb), and current feedback (IL) are monitored. The method 300 then sets the control mode to either an efficient state or an optimized state. At step 306, peak input voltage (Vin_pk), a slope of Vo_fb, and manipulated power from the slope is calculated. At step 308, a decision is made as if the control mode is in the efficient state. At step 310, if it is determined that the control mode is in the efficient state, then the method 300 sets a mode of operation to a boost mode, a buck-boost mode or a buck mode. Alternately, at step 324, if it is determined that the control mode is in the optimized state, then the method 300 sets the mode of operation to a boost mode or a buck-boost mode.

Further, at step 326, a decision is made as if Vo_fb>Vin_pk. At step 328, if Vo_fb<Vin_pk, then the method sets operation to buck-boost mode. Alternately, at step 330, if Vo_fb>Vin_pk, then the method 300 sets operation to boost mode.

At step 312, a decision is made as if Vo_fb<Vin_pk−hys. At step 314, if Vo_fb<Vin_pk−hys, then the method sets operation mode to boost mode. At step 318, a decision if made if Vo_fb>Vin_pk+hys. At step 316, if Vo_fb>Vin_pk−hys and Vo_fb<Vin_pk+hys, the method sets the operation mode to the buck-boost mode. At step 320, if Vo_fb>Vin_pk−hys and Vo_fb>Vin_pk+hys, the method sets the operation mode to the buck mode.

The method 300 proceeds to step 322 at which, the method sets the current limiting constant (Km) as per mode of operation and state of the PFC converter circuit. The method further sets a preferred technique as either IGC or IVC.

At step 332, a decision is made as if preferred technique is IGC. At step 334, if the preferred technique is IGC, the method calculates a transient Ki and compensating window time and from manipulated power set the desired value of a voltage_EA output.

At step 336, a decision is made if slope is greater than critical value. At step 338, if slope>Cri, load flag is set to 1. At step 340, a decision is made if the load flag equals 1 for the first cycle. At step 342, if the load flag equals 1 for the first cycle, the method sets Ki to a calculated value and checks for the integral value during transient window.

The method proceeds to step 344, at which the method performs control with a predetermined state and parameter for voltage_EA and current_EA, if the slope<Cri and the load flag is not equal to 1 for the first cycle. At step 346, the method updates a pulse width modulation (PWM) with a required value for each switch as per above method steps. The method proceeds to step 356, at which the method ends.

At step 348, a decision is made as if a desired value reaches during the transient window. At step 352, the method shows an error, if the desired value does not reach during the transient window. At step 350, the method updates a PWM with a required value for each switch as per above method steps. The method proceeds to step 354, at which the method ends.

At step 358, the method calculates an integral value for voltage_EA output based on manipulated power, if the preferred technique is IVC. At step 360, a decision is made if slope>Cri. At step 362, if slope>Cri, load flag is set to 1. At step 364, a decision is made if the load flag equals 1 for the first cycle. At step 366, if the load flag equals 1 for the first cycle, the method resets the integral portion of the voltage_EA to the calculated value, if the load flag equals 1 for the first cycle. At step 368, the method updates a PWM with a required value for each switch as per above method steps. The method proceeds to step 370, at which the method ends.

At step 344, the method performs control with predetermined state and parameter for voltage_EA and current_EA, if the slope<Cri and the load flag is not equal to 1 for the first cycle. At step 346, the method updates a PWM with a required value for each switch as per above method steps. The method proceeds to step 356, at which the method ends.

Figure 4:
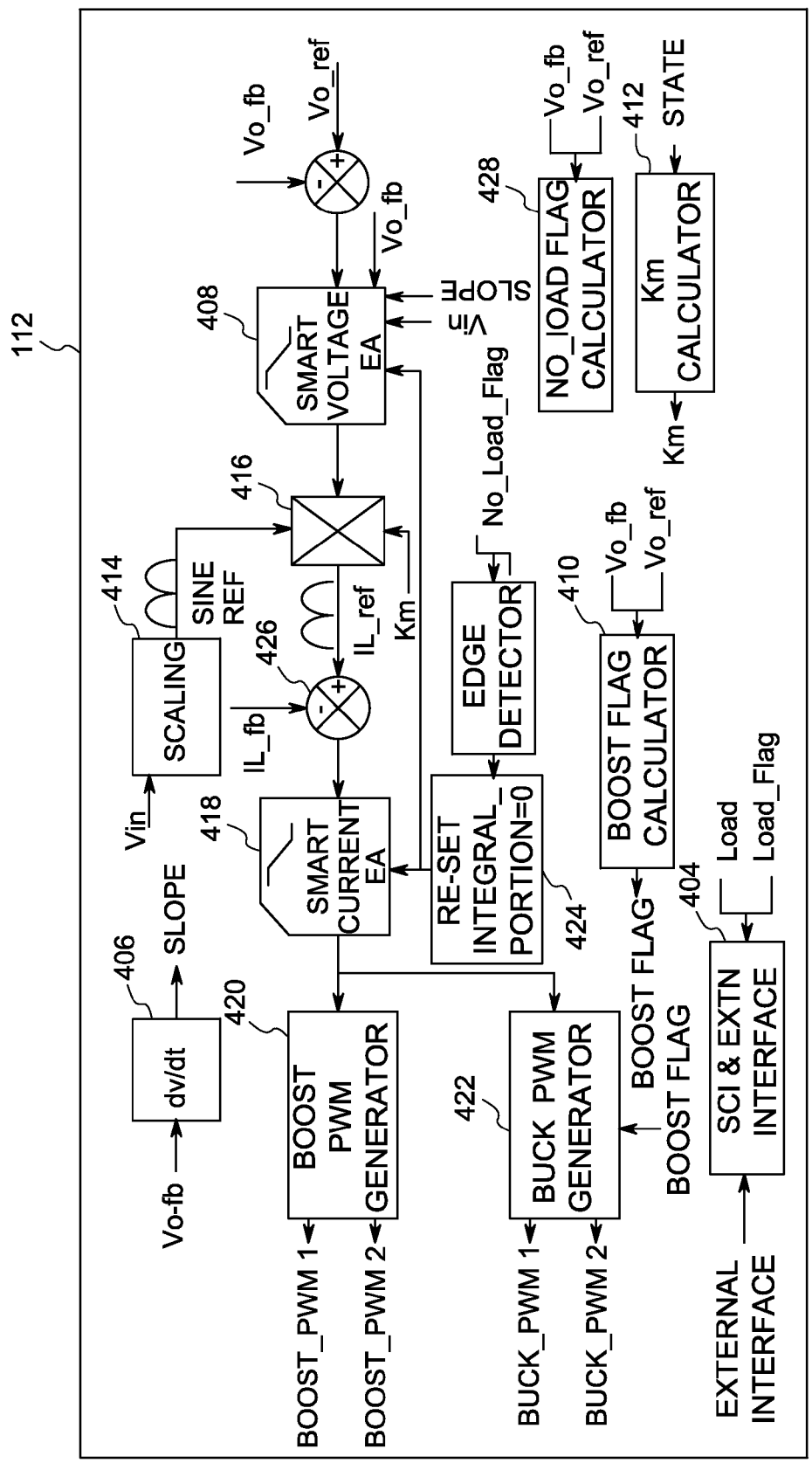
FIG. 4 is a schematic diagram of a control method in accordance to an embodiment of the invention.

FIG. 4 illustrates a schematic diagram of proposed control method. FIG. 4 explains a control block diagram as depicted by the method described in FIGS. 3A and 3B and the PFC converter circuit 200 of FIG. 2. There are two modes of control schemes namely an optimized mode and an efficient mode. The efficient mode improves power transfer capacity as compared to the optimized mode but implementation is more complex and handles more transient operations. During an optimized mode of the control scheme, there are two mode of operation, i.e., 'boost mode' and 'buck-boost mode'. The buck-boost mode is used while charging and when the output voltage is lower than the instantaneous input voltage during each input cycle, while the boost mode is used when the output voltage is more than the instantaneous input voltage in the same cycle. Also, the PFC converter circuit 200 operates in the boost mode when the desired voltage is more than the input-peak voltage or when the output voltage is higher than the input peak voltage during a high pulse load.

As described above and referring to FIG. 2, during the buck-boost mode, switches Q1 and Q3 are turned ON/OFF together and diodes D1 and D3 follow. The switches Q2 and Q4 are switched ON/OFF together but the switching pulse is 180 degrees phase shifted from switches Q1 and Q3. Therefore, the voltage developed across the storage device 108 is controlled by a switching action of all switches and diodes, and hence, no development of inrush current.

Controlling duty cycle (d) of switches maintains the inrush current at a specified level. The relationship between the input_current and inductor_current in the buck-boost mode is Iin (ac)=d*IL, while in boost mode, it is Iin (ac)=IL. Similarly, the relationship between the output voltage Vo to input voltage Vin in the buck-boost mode is Vo=(Vin*(d/1−d)), while in boost mode it is Vo=(Vin*(1/1−d)). Therefore, during the buck-boost mode, Vo is low, and hence d and In (ac) is low and it increases with an increase in Vo. Finally, once it is in boost mode, In (ac) saturates at a maximum value, which is a controlled current.

The PFC controller 112 has A to D converters to process all feedinback and also provides the provision for an external interface 404 to get a load value and load flag value. Alternatively, the slope from block 406 of output voltage feedback gives indirect but proportional value of load and time. A voltage EA module 408 uses this information differently based on the algorithm selected to compensate required input AC current instantaneously for a given pulse load.

A boost flag indicates mode of operation and is decided by a boost flag calculator 410 and a process flow for the same is explained in FIG. 3A. A current limiting constant (Km) calculator 412 also uses the state (start-up or load) and the boost-flag to decide Km, which in turn decides the peak current limit. The module 414 utilizes an algorithm to produce rectified scaled down sinusoidal waveform, which is multiplied to the output of the voltage_EA module 408 and Km using a multiplier 416. The output of the multiplier 416 is the current reference for inductor current, which is sinusoidal in shape. By selecting a different Km, we can control input current to a different value. Hence Km is selected based on states (charging or running), boost_flag and also Vin_pk to compensate for power line sag. Therefore, we can control charging and loading current at desired value and feed forward technique to ensure no output voltage disturbance, during input AC voltage sag. Finally a current_EA module 418, which is coupled to the IL_fb, gives output to control the duty cycle (d) through PWM generator 420 and 422. The PWM generator 420 provides the switching pulse for boost switches Q3 and Q4 (refer to FIG. 2), which is 180 degrees phase shifted when PFC converter circuit 200 operates in boost mode as well as buck-boost mode but the PWM is switched off once the PFC converter circuit 200 operates in the buck mode. Similarly, the PWM generator 422 provides switching pulses to Q1 and Q2 (180 degrees phase shifted) when PFC converter circuit 200 operates in buck mode as well as buck-boost mode, while it completely switches ON the PWM if the PFC converter circuit operates under boost mode. The PWM is coupled to a power module to complete the control loop. This control loop operates for all modes and states of the PFC converter circuit.

Figure 4A:
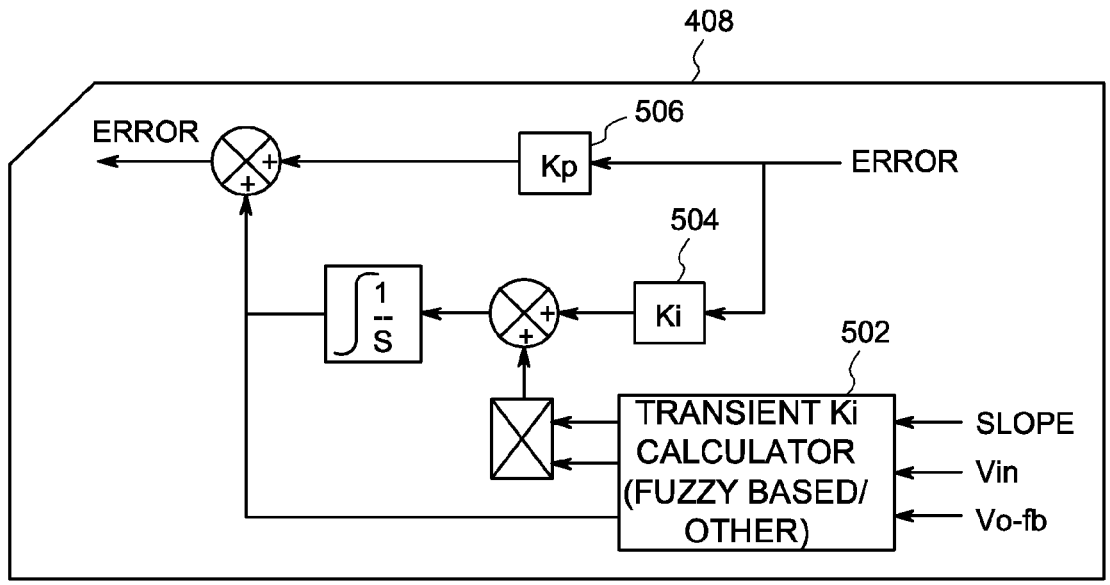
FIG. 4A is a control block diagram of an integral gain compensation (IGC) technique in accordance to an embodiment of the invention.

FIG. 4A is a control block diagram explaining IGC with an embodiment of the invention. A transient Ki calculator 502 takes the slope calculated from the block 406, Vin, Vo_fb (refer to FIG. 4 above) and present value of integral from PI. From slope, Vin and Vo_fb, the time at which load is applied and its load value is manipulated. Once the load value is known, it gives the target value for integral of voltage EA to compensate the input current. To do that output of the Ki calculator 502 is transient Ki for specified time (transient window for compensation). This is added to present Ki and integral value is monitored. Selection of Ki can be straight forward if all parameter of PFC 200 is known else a fuzzy logic is used to select Ki and time based on characterization of PFC. The transient window time is much smaller and negligible as compare with pulse load time. So using the IGC technique, the required input current is achieved almost instantaneously. A similar result can be achieved using the IVC technique, as explained in FIG. 4B.

Figure 4B:
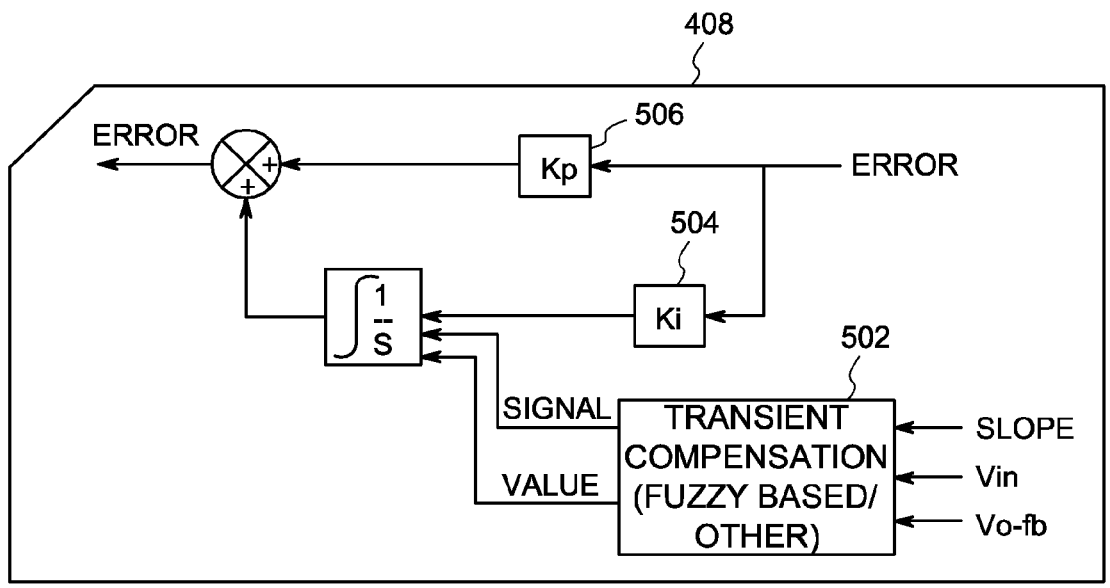
FIG. 4B is a control block diagram of the integral value compensation (IVC) technique in accordance to an embodiment of the invention.

FIG. 4B is a control block diagram of IVC with another embodiment of the invention. Referring to FIG. 4B, a transient compensation module 502 takes slope, Vin, Vo_fb etc as input (refer to FIG. 4 above) and computes the required value of integral of PI if all parameters are known, otherwise, it uses fuzzy logic to decide the value if all parameters are not known. Apart from the integral value, the transient compensation module 502 also provides a reset signal, which resets the integral value to a required value to compensate the input current. Both techniques provide similar results, but the IGC technique, as explained in FIG. 4A is preferred for its improved transient performance.

Figure 5:
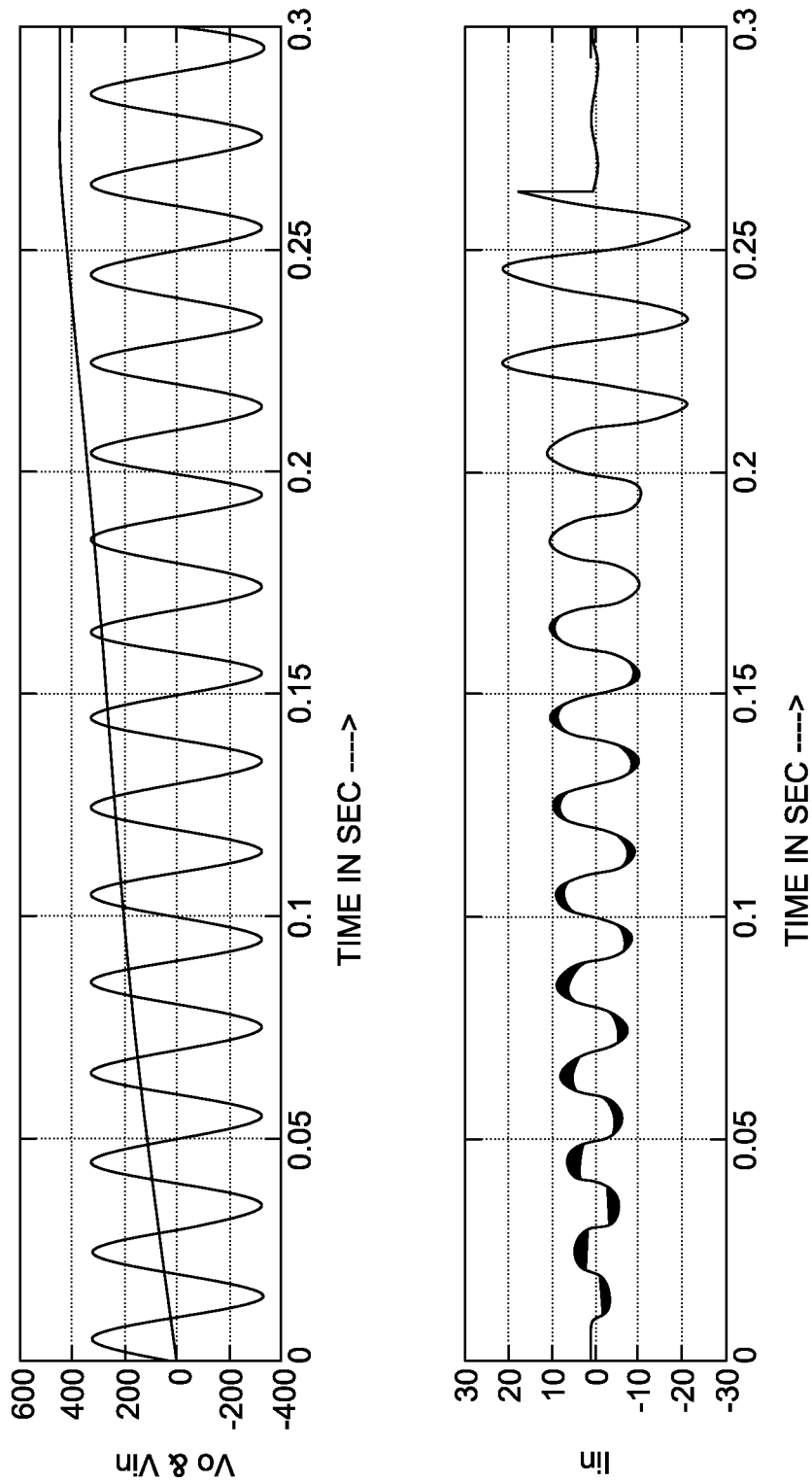
FIG. 5 illustrates a graph depicting inrush current control in accordance to an embodiment of the invention.

FIG. 5 illustrates a graph depicting inrush current control with an embodiment of the invention. Input current Iin is increasing gradually with respect to increase in Vo and saturates to a given maximum value. The slope of gradual increase and maximum value of peak current are controlled parameter, hence giving the flexibility in controlling the inrush current at desired level. Since for same IL, input current In (ac) in buck-boost mode is much lesser than boost mode, and boost mode can deliver more power than buck-boost mode with same stress level on power devices. Therefore, it starts in boost mode during high pulse load and changes its mode of operation from buck-boost mode to boost mode or vice versa in each input cycle, when output voltage goes lower than peak input voltage due to limitation on input current.

There is special case, when the PFC converter circuit operates near the zero crossing of the input voltage. Since, duty cycle 'd' is almost the same in boost mode as well as buck-boost mode of operation at the zero crossing of the input voltage, therefore, changing of the mode can be done at the zero crossing resulting in a very stable system but power transfer capability further goes lower (inefficient system). In this case, the PFC converter circuit 200 changes its mode of operation only when output voltage is lesser or greater than input peak voltage, i.e., the PFC converter circuit operates in boost mode voltage when the output voltage is greater than the input voltage, otherwise it operates in buck-boost mode. Sinusoidal current and desired output voltage is maintained in both modes by integrating current feedback from 210 (of FIG.2), the input voltage-feedback from input voltage measuring circuit 206, the output voltage feedback from voltage measurement circuit 202 and applied to the PFC controller 112.

Figure 6:
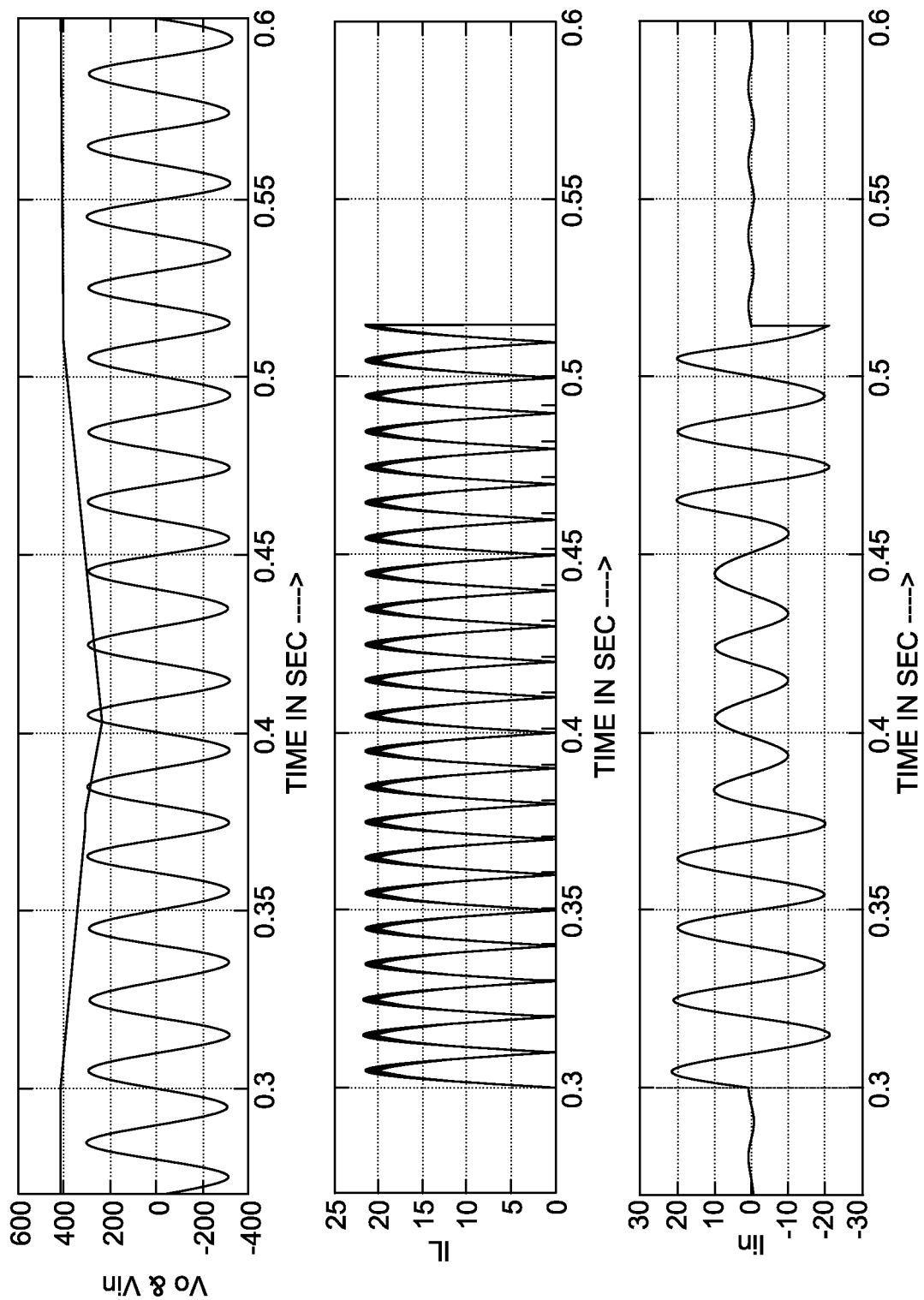
FIG. 6 illustrates a graph depicting line current control during very high pulse load (normal mode) in accordance to an embodiment of the invention.

FIG. 6 illustrates a graph depicting line current control during very high pulse load (normal mode) with another embodiment of the invention. The PFC converter 200 operates in boost mode until output voltage is higher than input peak but changes its mode of operation as per FIG.3A when output voltage goes down. During the 'efficient mode' of the control technique, there are three modes of operation i.e. 'boost mode', 'buck-boost mode' and 'buck mode'. The buck-boost mode is used while start-up charging or when the output voltage is approximately equal to the input peak voltage, i.e., this mode is used only during start-up (same as in normal mode) or when the mode transition from boost mode to buck mode and vice versa is required.

Figure 7:
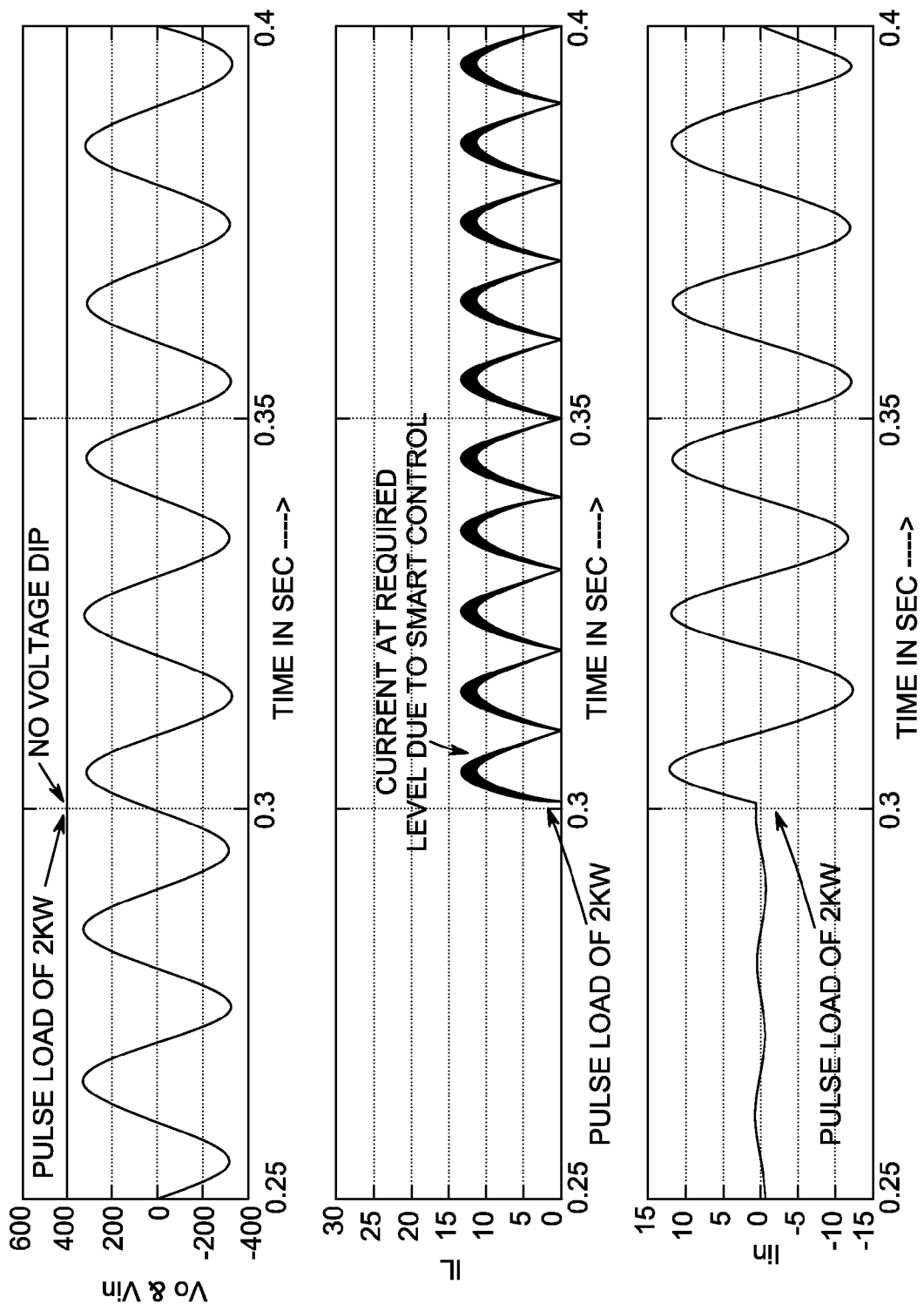
FIG. 7 illustrates a graph depicting line current control during lower pulse load (normal mode or efficient mode) in accordance to an embodiment of the invention.

FIG. 7 illustrates a graph depicting line current control during lower pulse load (normal mode or efficient mode) with an embodiment of the invention. FIG.7 represents a case where the pulse load is smaller than the maximum input power available. The required current is compensated using IVC or IGC instantaneously resulting in zero voltage drop in the DC bus at the time when the DC bus capacitor is very small.

Figure 8:
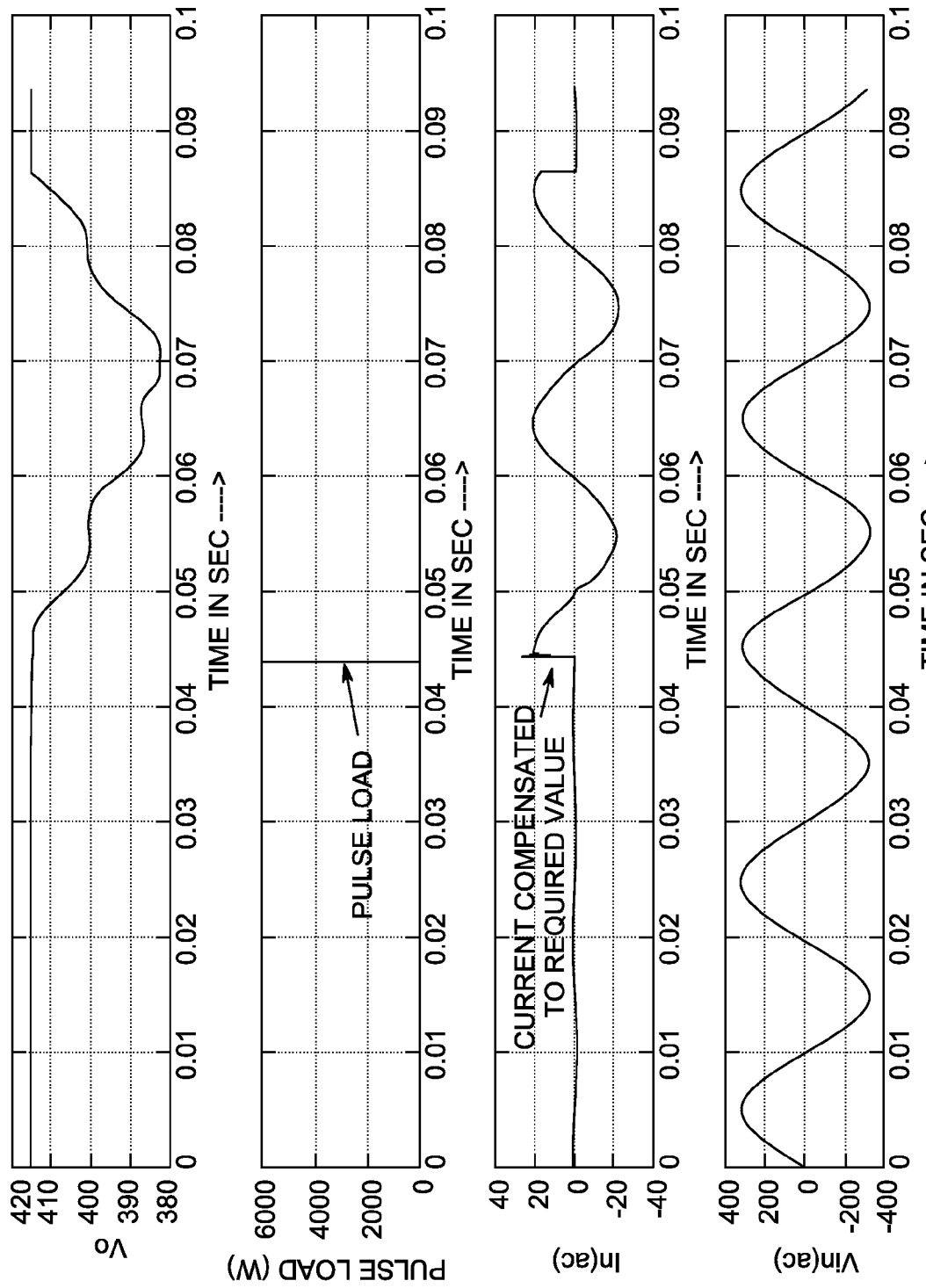
FIG. 8 illustrates a graph depicting line current control when load is applied at non-zero crossing in accordance to an embodiment of the invention.

FIG. 8 illustrates a graph depicting line current control when a load is applied at the non-zero crossing with an embodiment of the invention. FIG. 8 shows a condition when the load is applied at the non-zero crossing position of the input AC voltage. Due to single loop operation and stability of IVC or IGC, the current is compensated to non-zero value instantaneously. A detailed flow diagram for implementation of IVC or IGC is explained in FIG. 3B above.

Figure 9:
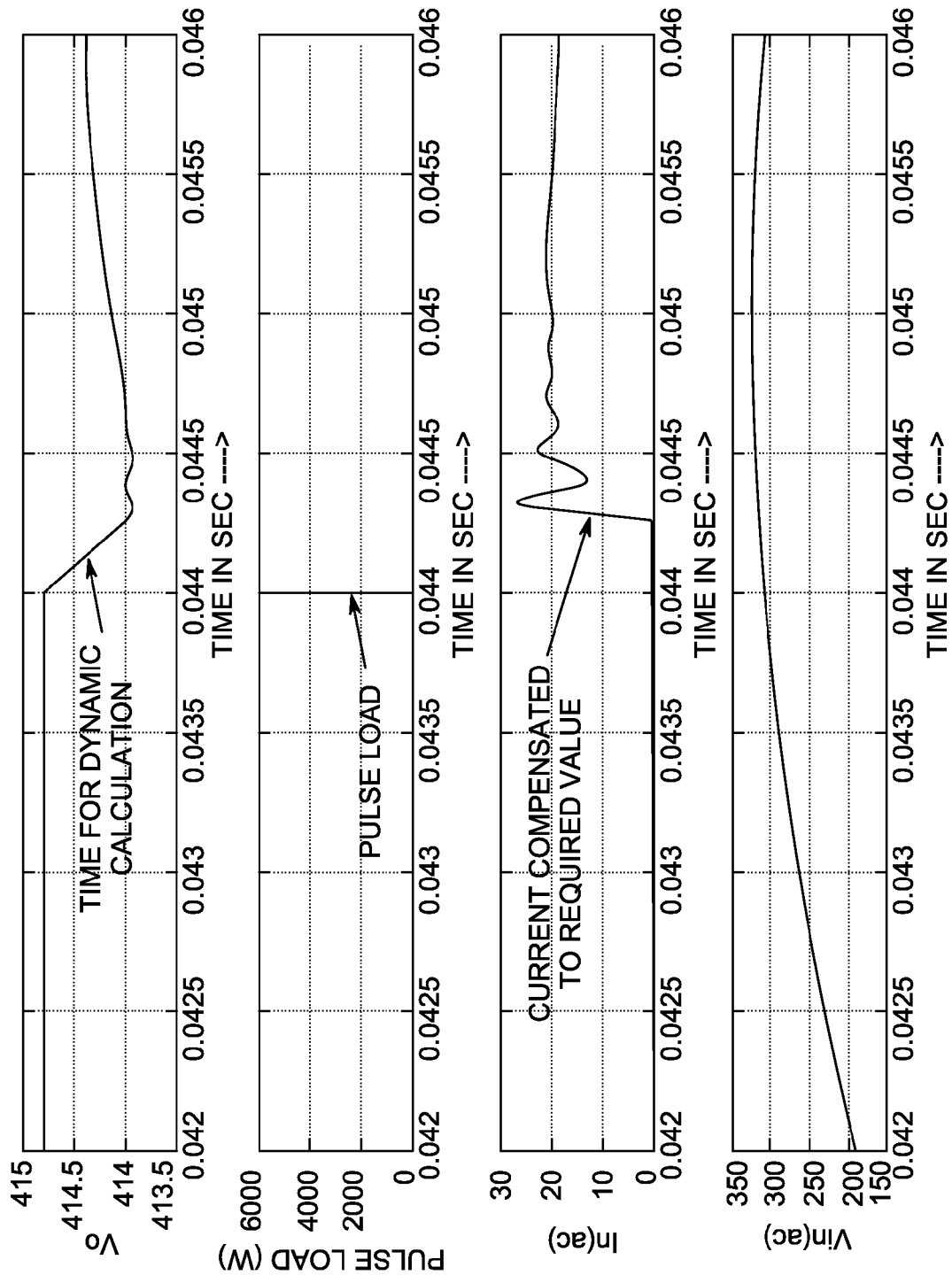
FIG. 9 illustrates a graph depicting instantaneous line current compensation using IGC and/or IVC in accordance to an embodiment of the invention.
Figure 10:
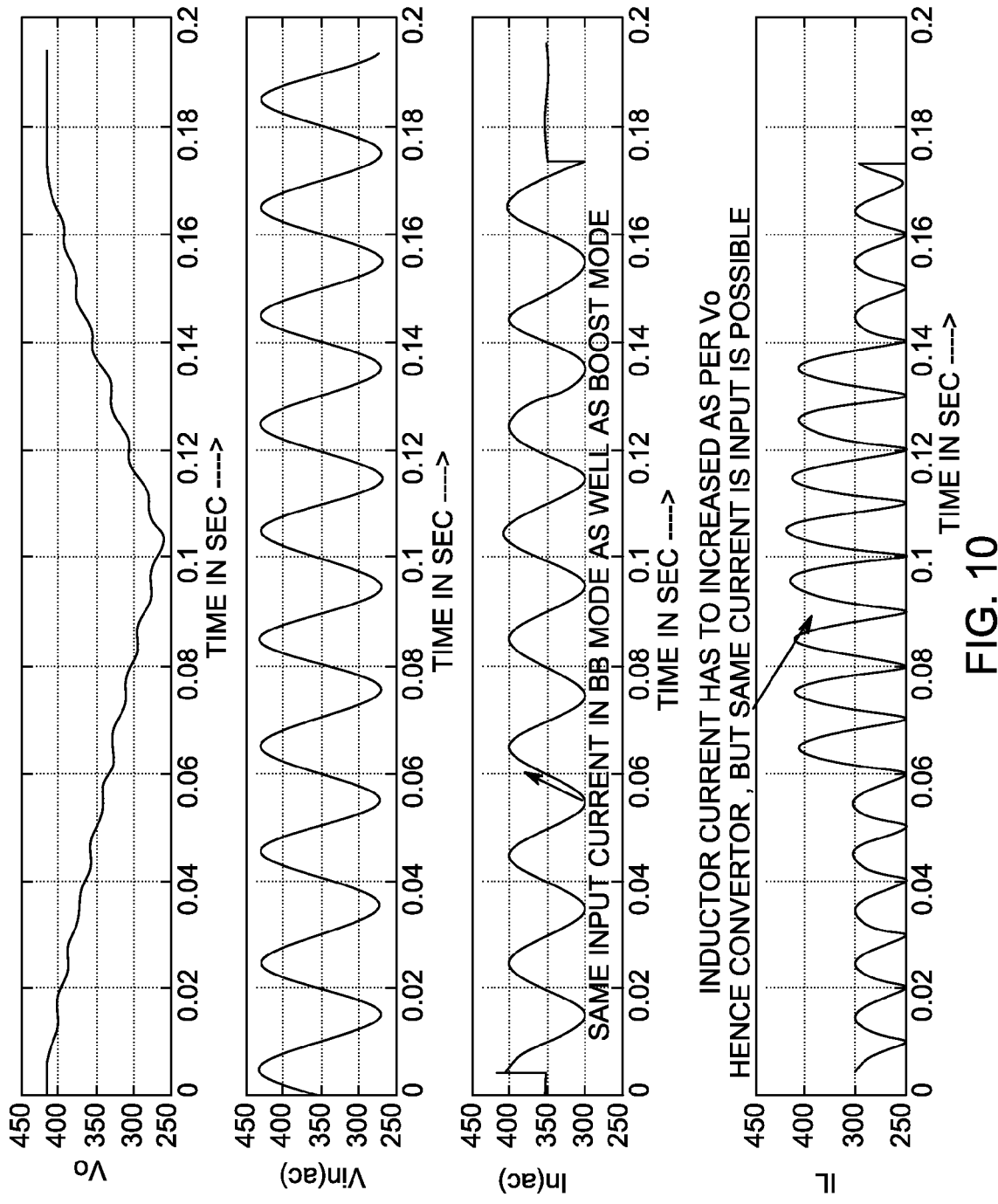
FIG. 10 illustrates a graph depicting line current control during very high pulse load (efficient mode) in accordance to an embodiment of the invention.

FIG. 9 illustrates a graph depicting instantaneous line current compensation using IGC or IVC with an embodiment of the invention. FIG. 9 clearly shows the compensation of input current at a required level within a very small time (less than 100 us). Effects of IVC or IGC are also evident in FIG. 6, FIG. 7, FIG. 8, FIG. 9 and FIG. 10.

Figure 11A:
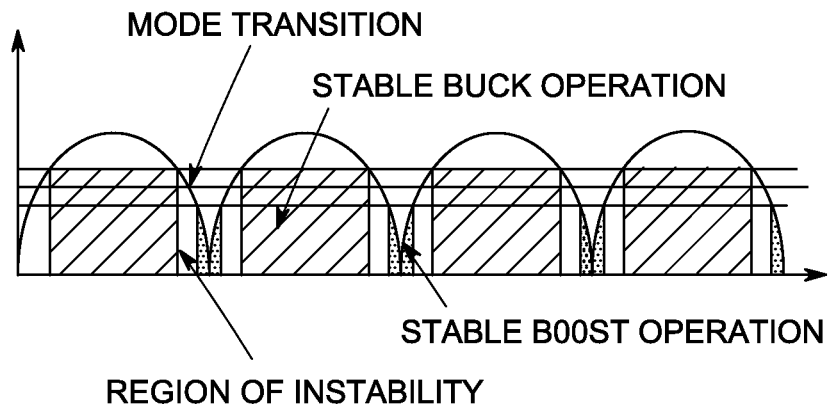
FIG. 11A illustrates a graph depicting a problem of non stability while transitioning mode from boost to buck directly in accordance to an embodiment of the invention.

FIG. 11A illustrates a graph depicting a problem of non-stability while transitioning the operating mode from boost to buck directly with an embodiment of the invention. As shown in FIG. 11A, there is an instability region, where a change of mode from boost to buck or vice versa is possible, which results in oscillation in input current (degradation power factor).

Figure 11B:
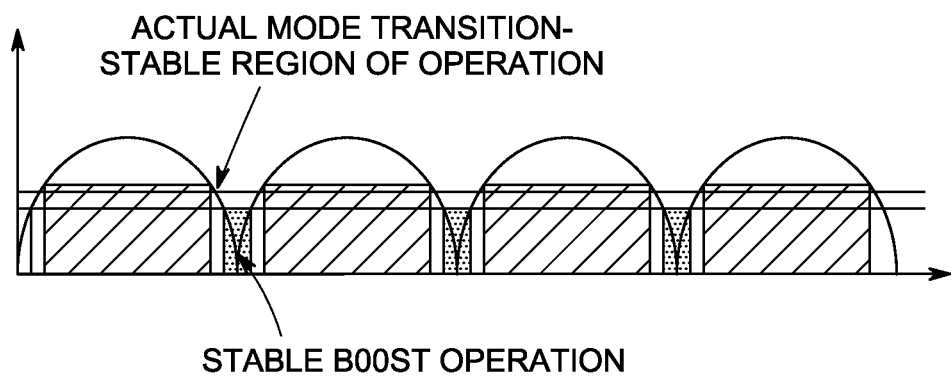
FIG. 11B illustrates a graph depicting stable operation while transitioning mode from boost to buckboost or buck to buck-boost in accordance to an embodiment of the invention.

FIG. 11B illustrates a graph depicting stable operation while transitioning the operating mode from boost to buck-boost or buck to buck-boost with an embodiment of the invention. When the mode change is from boost to buck-boost to buck or vice versa, the change of mode happens in a stable region.

The various embodiments of the present invention offer various advantages. It meets the increasing demand of high power X-ray mobile or a portable system, which can work with a standard wall socket (16 A max) and a stringent requirement in the form of PFC, total harmonic distortion and inrush current from different regulatory bodies, which otherwise has to specify the input specification and will not be free to use any standard wall socket. For equipment like mobile or portable X-ray machines, this will be a big constraint as it contradicts the definition of system (portable system is supposed to be used at any place where a patient is present). Also this reduced requirement of a storage device makes the design very compact and light.

The control algorithm and switching scheme in the present disclosure is unique. The proposed technique utilizes IGC or IVC, which is basically a hybrid configuration of feedback and feed-forward compensation schemes and is done on voltage_EA. The innovative compensation schemes are breakthrough technology to achieve highest peak power to volume ratio of the converter. Also this control algorithm has multiple modes of operations like boost mode, buck mode and buck-boost mode unlike in orthodox solution where it has only buck mode and boost mode. The buck-boost mode gives legal region of operation in vicinity when output voltage is near to input voltage and transition from one mode to other mode as explained under Normal mode or efficient mode. It helps in changing from one mode to another in a highly stable way without disturbing the input current or output voltage. This special feature helps in maintaining the sinusoidal current waveform in all mode of operation without distortion. This particular disclosure also reveals implementation of an interleaved scheme for both modes of operations. A power circuit for interleaved operation in buck-boost is novel and no extra control algorithm is required to implement this. The said technique/apparatus enables in making a very compact, low cost, high power density and stable PFC.

The proposed control algorithm is very useful for an application, where the load range is very large and includes a pulse load, which is higher than the available input power from a standard wall socket. For example a radiographic X-ray mobile or portable machine has wide load range, which generally varies from tens of watts to a few kilo-watts. If it is desired to operate this kind of machine with a standard wall socket, the present converter circuit 200 may be particularly useful. The PFC converter circuit 200 gives smallest possible size for a storage device requirement due to its unique technique of IVC or IGC and helps in meeting all regulatory requirements for inrush/harmonics requirements.

While only certain features of the invention have been illustrated and described herein, modifications and changes will occur to those skilled in the art. It is, therefore, to be understood that the appended claims are intended to cover all such modifications and changes as fall within the true spirit of the invention.

What is claimed is:

1. A power circuit for protecting against high pulse load current and inrush current, the power circuit comprising:
    a buck-boost module; and
    a power factor correction (PFC) controller operatively coupled with the buck-boost module, the PFC controller is configured to receive an input voltage feedback, an output voltage feedback, and current feedback, and is configured to utilize one of an Integral Gain Compensation (IGC) technique wherein the IGC calculates a transient integral gain and compensates a window time and sets an output of a voltage error amplifier, and an Integral Value Compensation (IVC) technique wherein the IVC calculates the integral value for the voltage error amplifier based on a manipulated power, to control the high pulse load current and inrush current in the power circuit instantaneously for a given pulse load.

2. The power circuit of claim 1, wherein the power circuit operates in one of a normal mode and an efficient mode to change its mode of operation without losing input current stability.

3. The power circuit of claim 2, wherein during the normal mode, the buck-boost module operates in a boost mode when an output DC voltage is higher than an instantaneous input AC voltage, and operates in a buck-boost mode when the output DC voltage is lower than the instantaneous input AC voltage.

4. The power circuit of claim 2, wherein during the efficient mode, the buck-boost module operates in a boost mode when an output voltage is higher than an instantaneous input AC voltage, operates in a buck-boost mode when the output voltage is approximately equal to the instantaneous input AC voltage, and operates in a buck mode when the instantaneous input AC voltage is higher than the output voltage.

5. A method for controlling high pulse load current and inrush current in a power circuit, the method comprising:
    receiving an input voltage feedback;
    receiving an output voltage feedback;
    receiving a current feedback; and
    utilizing one of an Integral Gain Compensation (IGC) technique wherein the IGC calculates a transient integral gain and compensates a window time and sets an output of a voltage error amplifier, and an Integral Value Compensation (IVC) technique wherein the IVC calculates the integral value for the voltage error amplifier based on a manipulated power, for managing operations of the power circuit in order to control the high pulse load current and the inrush current in the power circuit instantaneously.

6. A method utilizing one of an Integral Gain Compensation (IGC) and an Integral Value Compensation (IVC) technique for controlling charging or loading current at a value for ensuring no output disturbances, the method comprising:
    determining a load value and a load flag value;
    providing a slope of an output voltage feedback and manipulating load values and time values;
    compensating a required input alternating current instantaneously for a given pulse load by utilizing one of the IVC and the IGC;
    providing a boost flag, the boost flag indicating a mode of operation;
    calculating a current limiting constant;
    producing a rectified scaled down sinusoidal waveform;
    multiplying an output from a voltage error amplifier with the current limiting constant; and
    providing an output to control a duty cycle and control inductor current values by changing the current limiting constant for controlling charging or loading current at a value for ensuring no output disturbances.

7. The method of claim 6, wherein utilizing the IGC and the IVC comprises controlling the desired input current instantaneously and reducing the storage device requirement to a minimum possible value.

8. The method of claim 6, wherein utilizing the IGC and the IVC comprises utilizing a fuzzy logic technique to decide an integral gain and an integral gain value if parameters of a PFC converter circuit are not known.

9. The method of claim 6 further comprising providing a switching circuit where inrush current is ramped and both a ramp and a value of a maximum peak current value is controlled at a desired level.

10. A dynamic compensation method for controlling high pulse load current and inrush current in a power circuit, the method comprising:
- calculating one or more parameters;
- operating the power circuit in one of a normal mode and an efficient mode and changing its mode of operation without losing input current stability;
- during the normal mode, operating the power circuit in a boost mode when an output DC voltage is higher than an instantaneous input AC voltage, and operating in a buck-boost mode, when the output DC voltage is lower than the instantaneous input AC voltage;
- during the efficient mode, operating the power circuit in the boost mode when the output DC voltage is higher than the instantaneous input AC voltage, working in the buck-boost mode when the output DC voltage is approximately equal to the instantaneous input AC voltage, and operating in a buck mode when the instantaneous input AC voltage is significantly higher than the output DC voltage;
- setting a current limiting constant as per an operation mode and a state of the power circuit and setting a technique as one of an integral gain compensation (IGC) and an integral value compensation (IVC);
- calculating a transient integral gain and compensating a window time and setting an output of a voltage error amplifier, when the technique is the integral gain compensation (IGC);
- setting the integral gain to the calculated value and checking for the integral value during a transient window;
- calculating the integral value for the voltage error amplifier based on the manipulated power, when the technique is the integral value compensation (IVC);
- resetting the integral portion of the voltage error amplifier to the calculated integral value; and
- updating one or more pulse width modulators with a value.

11. The method of claim 10, wherein calculating the one or more parameters comprises calculating a peak input voltage, a slope of output voltage feedback, and a power from the slope.

* * * * *